(12) United States Patent
Euchner et al.

(10) Patent No.: US 7,480,801 B2
(45) Date of Patent: Jan. 20, 2009

(54) METHOD FOR SECURING DATA TRAFFIC IN A MOBILE NETWORK ENVIRONMENT

(75) Inventors: Martin Euchner, München (DE);
Volkmar Lotz, München (DE);
Sebastian Mödersheim, Gundelfingen (DE); Haykal Tej, München (DE)

(73) Assignee: Siemens Aktiengesellschaft, Munich (DE)

( * ) Notice: Subject to any disclaimer, the term of this patent is extended or adjusted under 35 U.S.C. 154(b) by 682 days.

(21) Appl. No.: 10/899,804

(22) Filed: Jul. 26, 2004

(65) Prior Publication Data

US 2005/0021955 A1    Jan. 27, 2005

Related U.S. Application Data

(63) Continuation of application No. PCT/DE03/00017, filed on Jan. 7, 2003.

(30) Foreign Application Priority Data

Jan. 24, 2002  (DE)  ................ 102 02 689
Nov. 28, 2002  (DE)  ................ 102 55 618

(51) Int. Cl.
*H04L 9/00* (2006.01)
(52) U.S. Cl. .................. 713/171; 713/175; 370/328
(58) Field of Classification Search ................ 380/258, 380/270, 277, 247, 248; 713/151, 168, 171, 713/175, 156, 155; 370/328, 277; 379/90.01; 455/3.01, 411, 432.1
See application file for complete search history.

(56) References Cited

U.S. PATENT DOCUMENTS 5,091,942 A   2/1992  Dent (Continued)

FOREIGN PATENT DOCUMENTS

CA     2 409 863 A1   11/2002

(Continued)

OTHER PUBLICATIONS

International Telecommunication Union: ITU-T H.235—Series H: Audiovisual and multimedia systems Infrastructure of audiovisual services—systems aspects Security and encryptio for H-series (H.323 and other H.245 based) multimedia terminals Feb. 1998.*
Quisquater et al.: "Computer Security- Esorics 98", 5th European Symposium on Research in Computer Security, Louvain-la-Neuve, Belgium, Sep. 16-18, Proceedings, 1998.

(Continued)

*Primary Examiner*—Kwang B. Yao
*Assistant Examiner*—Anh Ngoc Nguyen
(74) *Attorney, Agent, or Firm*—Laurence A. Greenberg; Werner H. Stemer; Ralph E. Locher

(57) ABSTRACT

In order to secure data traffic between an external network and a mobile user terminal coupled to the external network, the terminal and a data securing device of the external network produce a pair of private external keys by exchanging partial keys. One item of key information based on at least one of the partial keys, and one message certified by the terminal with a first home location key of the pair of home location keys, are transmitted by the data securing device to the home location network. The certification of the message is verified with a second home location key of the pair of home location keys and a certificate is issued for the key information. The certificate thus provided is transmitted to the data securing device and the pair of private external keys is accepted, subject to the verification of the transmitted certificate, in order to secure data traffic.

18 Claims, 3 Drawing Sheets

U.S. PATENT DOCUMENTS

| | | | |
|---|---|---|---|
| 5,594,795 | A | 1/1997 | Dent et al. |
| 5,596,641 | A | 1/1997 | Ohashi et al. |
| 5,668,875 | A | 9/1997 | Brown et al. |
| 5,940,512 | A | 8/1999 | Tomoike |
| 6,377,810 | B1* | 4/2002 | Geiger et al. ............ 455/456.2 |
| 6,918,035 | B1* | 7/2005 | Patel ........................... 713/169 |
| 7,111,322 | B2* | 9/2006 | Slick et al. ..................... 726/5 |
| 7,382,882 | B1* | 6/2008 | Immonen .................... 380/270 |
| 7,389,412 | B2* | 6/2008 | Sharma et al. .............. 713/153 |
| 2002/0186845 | A1* | 12/2002 | Dutta et al. ................. 380/247 |
| 2003/0210789 | A1* | 11/2003 | Farnham et al. ............. 380/270 |

FOREIGN PATENT DOCUMENTS

| | | |
|---|---|---|
| EP | 0 584 725 A1 | 3/1994 |
| WO | 00/48358 | 8/2000 |
| WO | 01/26322 A2 | 4/2001 |
| WO | 02/03730 A1 | 1/2002 |

OTHER PUBLICATIONS

Eiji Okamoto: "Application of the Encryption Technology"—Authentication and the Zero Knowledge Interactive Proof Scheme, bit, vol. 23, No. 13, Kyoritsu Shuppan Co., Ltd., JP, pp. 99-111, 1991.

Peter Wayner: "Technology of Digital Signature for enhancing the Safety of the Internet" Nikkei Byte, vol. 167, Nikkei BP Corp., JP, pp. 333-343, 1997.

Park, C.-S.: "On Certificate-Based Security Protocols for Wireless Mobile Communication Systems", IEEE Network, Sep./Oct. 1997, pp. 50-55.

* cited by examiner

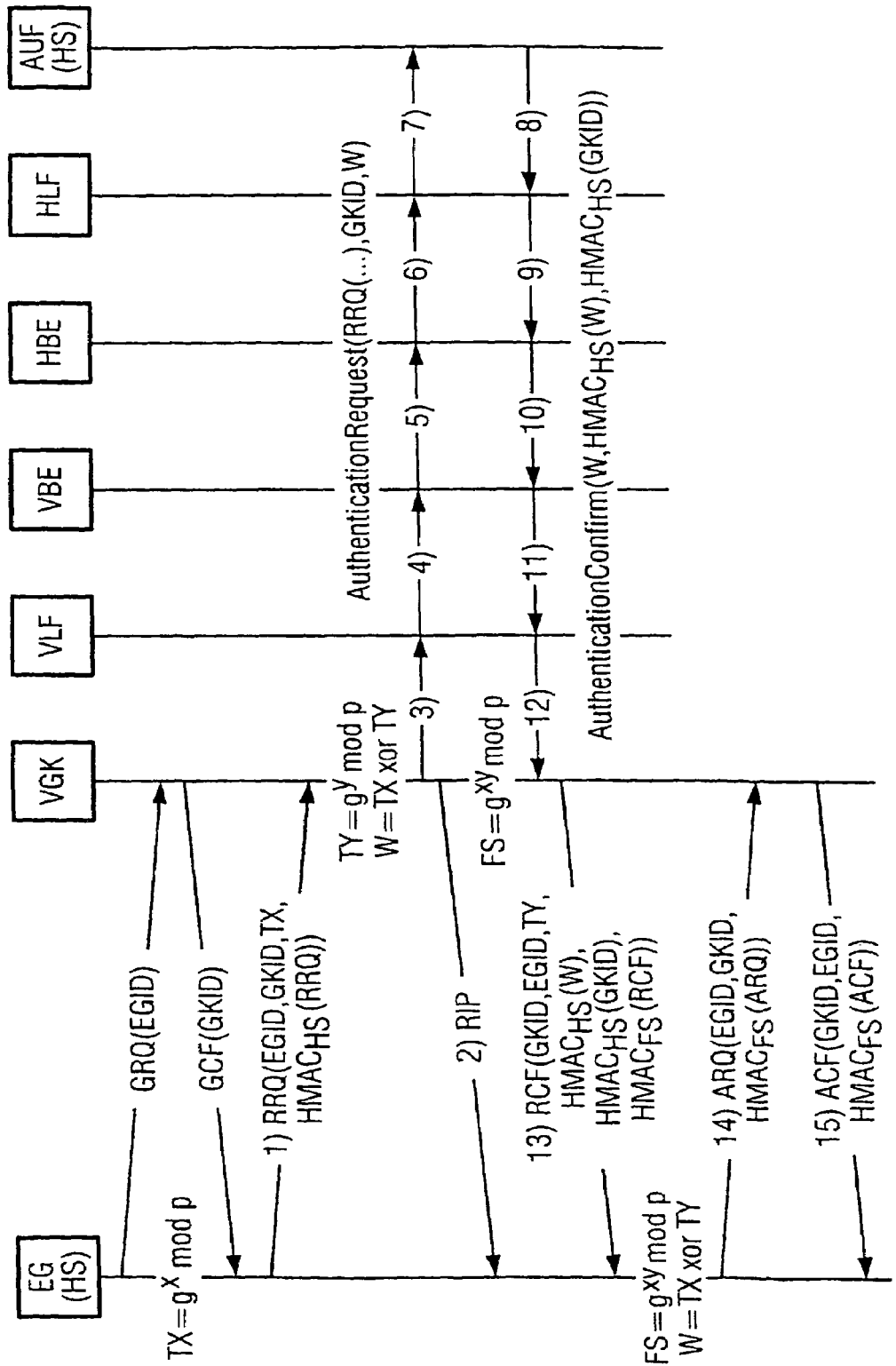

METHOD FOR SECURING DATA TRAFFIC IN A MOBILE NETWORK ENVIRONMENT

CROSS-REFERENCE TO RELATED APPLICATION

This application is a continuation, under 35 U.S.C. § 120, of copending international application No. PCT/DE03/00017, filed Jan. 7, 2003, which designated the United States; this application also claims the priority, under 35 U.S.C. § 119, of German patent application No. 102 02 689.0, filed Jan. 24, 2002 and German patent application No. 102 55 618.0, filed Nov. 28, 2002; the prior applications are herewith incorporated by reference in their entirety.

BACKGROUND OF THE INVENTION

Field of the Invention

The invention relates to a method in a mobile network environment for securing data traffic between an external network and a terminal of a mobile user registered in a home location network and coupled to the external network. In this context the terms home location network and external network can relate to different networks or different logical or physical areas, domains, or subnetworks of a network.

State of the art mobile network environments allow a geographically moving user to connect to external networks via decentralized terminals and to use these networks to obtain access to communication and application services as a function of their authorization in their home location network. A respective terminal can thereby be a component of the relevant external network used temporarily by the user or a mobile terminal in the possession of the user coupled temporarily to the external network.

In this context ensuring information security, particularly with regard to authentication and authorization of the mobile user and/or the terminal with regard to the external user and/or vice versa is a considerable problem. Generally a mobile user and/or a mobile terminal used by them is initially only registered in their home location network and not in the external network. To authenticate and/or authorize the user, an authentication or authorization request to the home location network can be initiated in the external network and access permitted as a function of a reply. With regard to the request and reply it should be ensured that, in particular in the case of network scenarios based on the internet, a respective communication route can operate between the external network and the home location network via a plurality of transit networks and transit components. These transit networks and transit components are however potentially insecure and therefore not to be trusted. It should therefore be ensured both with regard to the request and the reply that the result of the request is not degraded by unauthorized interception or corruption of or interference with the messages to be transmitted in this context between the external network and the home location network.

Such a method for securing data traffic in a mobile network environment is already known from a draft of ITU-T recommendation H.235 annex G published, for example, at ftp://140.242.1.131/avc-site/0110_Dub/AVD-2112a.zip.

With that method, key information to be used for the exchange of data between the terminal and the external network is requested from the external network in the home location network of the user. The requested key information is transmitted successively from the home location network via all, possibly insecure, transit networks to the external network. Transmission takes place encrypted link-by-link on the assumption that encrypted transmission is guaranteed between adjacent networks, protected in each instance by a trusted pair relationship. However such trusted pair-only relationships require the key information to be decrypted and then re-encrypted at each network interface. This means that the key information is available in clear text at every network interface, which represents a not insignificant security risk. Unauthorized intervention in the exchange of data between the external network and the home location network, to be secured by the key information, can therefore not be excluded.

A further disadvantage of the prior art method is that an encryption method used for the encrypted transmission of key information may infringe national export or import restrictions. This is particularly significant when the key information that is transmitted in encrypted form is itself used not for encryption but only for authentication or certification. The latter is generally not subject to legal restrictions.

SUMMARY OF THE INVENTION

It is accordingly an object of the invention to provide a method for securing data traffic in a mobile network environment which overcomes the above-mentioned disadvantages of the heretofore-known devices and methods of this general type and which provides for a simple and effective method for securing data traffic between an external network and a terminal of a mobile user coupled to the external network.

With the foregoing and other objects in view there is provided, in accordance with the invention, a method in a mobile network environment for securing data traffic between an external network and a terminal of a mobile user coupled to the external network, wherein the mobile user can be authenticated in a home location network by way of a private home location key pair. The method comprises the following steps:

a) producing a private external key pair by exchanging partial keys between the terminal and a data securing device of the external network;

b) transmitting from the data securing device to the home location network an item of key information based on at least one of the partial keys and a message certified by the terminal by way of a first home key of the home key pair;

c) verifying the certification of the message in the home location network with a second home location key of the home location key pair, and producing a certificate for the key information;

d) transmitting the certificate to the data securing device; and e) accepting the private external key pair for securing the data traffic subject to verification of the certificate transmitted from the home location network.

In other words, the data traffic between an external network and a terminal of a mobile user coupled to the external network, whereby said user can be authenticated in a home location network by means of a private home location key pair, is rendered secure in that the terminal and a data securing device of the external network produce a private external key pair by exchanging—preferably public—partial keys. The data securing device can hereby be provided for example by a server, a client or a connection controller, for instance in the form of a co-called gatekeeper, of the external network. According to the invention, one item of—preferably public—key information based on at least one of the partial keys and one message certified by the terminal by means of a first home location key of the home location key pair are transmitted by the data securing device to the home location network.

The term "certified message" as used herein refers in particular to a message secured by checksums. In the home location network, certification of the message is then verified by means of a second home location key of the home location key pair and a certificate is provided for the key information. The certificate thus provided is transmitted to the data securing device and the private external key pair is accepted subject to verification of the transmitted certificate in order to secure data traffic.

The private home location key pair and the private external key pair can hereby be provided by a symmetrical or an asymmetrical key pair. In the case of a symmetrical key pair, the respective key holders have corresponding private key elements. In the case of asymmetrical key pairs, the private key elements of the key holders are different but are related to each other in respect of their key function.

By verifying the message certified by the terminal and the key information certificate produced by the home location network, the identity of the terminal can be ensured in respect of the data securing device as can the authenticity of one or a plurality of partial keys. The authenticity of a relevant partial key means that the private external key produced can be confirmed as authentic without having to be forwarded to other network devices. An external key confirmed in this way can for example be used for secured authentication, authorization and/or to guarantee data integrity in the context of any subsequent data traffic between the terminal and the external network.

One important advantage of the present invention is that neither the private external key nor the private home location key has to be transmitted between the external network and the home location network. This results, in particular in cases where there are potentially insecure transit networks between the external network and the home location network, in a significant enhancement of information security compared with the prior art.

A further advantage of the present invention is that only minor modifications are required to existing communication systems, in particular communication systems according to ITU-T recommendation H.323, to implement the inventive method. Also no additional security relationships have to be provided between network entities of the external network, home location network or any transit networks. This is very advantageous, particularly in the case of externally administered transit networks, e.g. the Internet.

Other features which are considered as characteristic for the invention are set forth in the appended claims.

In accordance with an added feature of the invention, the certificate can be transmitted from the data securing device to the terminal and verified there. This means that the authenticity of a partial key received from the data securing device and/or the authenticity of the data securing device can be determined by the terminal.

The certificate can also be verified by the data securing device to verify the authenticity of the terminal and the partial key transmitted by it.

A negative authentication message can also be transmitted from the home location network to the data securing device, if verification of message certification produces a negative verification result.

In accordance with a particularly advantageous embodiment of the novel method, the private external key pair can be produced by means of what is known as the Diffie-Hellman method. Two or a plurality of devices can use such a method to calculate a private key common to all said devices by exchanging public partial keys. Provided the key is sufficiently long, this makes it practically impossible to derive the common private key from the public partial keys.

In accordance with another feature of the invention, the message and key information can be transmitted to the home location network in the context of an authentication request. The key information can also be transmitted to the home location network within the message. This avoids separate transmission or signaling.

A common certificate for the message and the key information can also be produced in the home location network and transmitted to the data securing device. As well as the message and the key information itself, the combination of said message and said key information is also certified by such a common certificate. In other words this certificate can be used to certify that said message is assigned precisely to said key information. Misuse of the message together with different key information can therefore be practically excluded.

Alternatively separate certificates can be produced for the message and the key information and transmitted to the data securing device.

According to a further advantageous embodiment of the invention a code identifying the terminal and/or the data securing device can be transmitted to the home location network for certification. A common certificate can also preferably be produced for this code and for the message and/or the key information and transmitted to the data securing device. Such a certificate can then be used to verify that said code is assigned precisely to said message and/or precisely to said key information. Misuse of the code in conjunction with another message and/or key information can therefore be practically excluded.

According to a further embodiment of the inventive method, the key information can be produced by means of an arithmetic and/or logical linking of a plurality of partial keys, e.g. by adding, multiplying or an XOR link. The key information can also be produced by means of an arithmetic and/or logical linking of at least one partial key and protection data also produced by the terminal. Such protection data can for example be a random number or a time stamp. The key information can also comprise one or a plurality of unchanged partial keys.

The exchange of the partial keys between the terminal and the data securing device can also take place in the context of the data transmissions between the terminal and the data securing device, as required for the data exchange with the home location network.

In particular the exchange of partial keys can be synchronized with the authentication traffic between the external network and the home location network or integrated in this. In this way the number of messages to be exchanged in total can be optimized.

According to a further advantageous embodiment of the invention the data exchange between the data securing device and the home location network can take place by means of signaling messages according to the ITU-T recommendation H.235. Unlike the prior art, the inventive method does not require any extension of the H.235 signaling messages to implement the necessary data exchange.

In particular the invention can be implemented in a simple manner in communication systems according to the ITU recommendation H.323 or—alternatively—according to the SIP (Session Initiation Protocol) standard.

According to one advantageous development of the invention, at least one part of the key information transmitted by the data securing device to the home location network is transmitted from the home location network to the data securing device, in order to accept the private external key pair to secure data traffic subject to verification of the transmitted part of the key information. Verifying the part of the key information transmitted from the home location network to the data securing device prevents an attack on the network environment, wherein the attacker first intercepts the certificate transmitted from the home location network to the data securing device and then uses this intercepted certificate to authenticate a non-authentic terminal with. Such an attack is in particular avoided in that transmitting key information to the data securing device allows verification of whether the key information transmitted originally by the data securing device to the home location network corresponds to the key information transmitted. If there is no correspondence, the certificate transmitted to the data securing device was not actually produced in the home location network. If only the certificate were transmitted to the data securing device, it could not be analyzed by the data securing device, as the certificate was produced using a home location key, which is not known in the data securing device. This would allow the attack on the network environment as described above.

According to one advantageous embodiment of the invention, the part of the key information transmitted from the home location network to the data securing device is verified in the data securing device, as a result of which a potential attack on the network environment can be identified at an early stage. Also all the key information transmitted to the home location network is preferably transmitted to the data securing device and verified. To verify the part of the key information transmitted from the home location network, it is preferably determined whether the part of the key information transmitted from the home location network is part of the key information transmitted to the home location network by the data securing device. If this verification is negative, the certificate transmitted to the data securing device was not actually produced in the home location network and the method is terminated.

Although the invention is illustrated and described herein as embodied in a method for securing data traffic in a mobile network environment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2 and 3 each shows a schematic illustration of a flow diagram with a signaling sequence for securing data traffic according to the invention.

DESCRIPTION OF THE PREFERRED EMBODIMENTS

Figure 1:
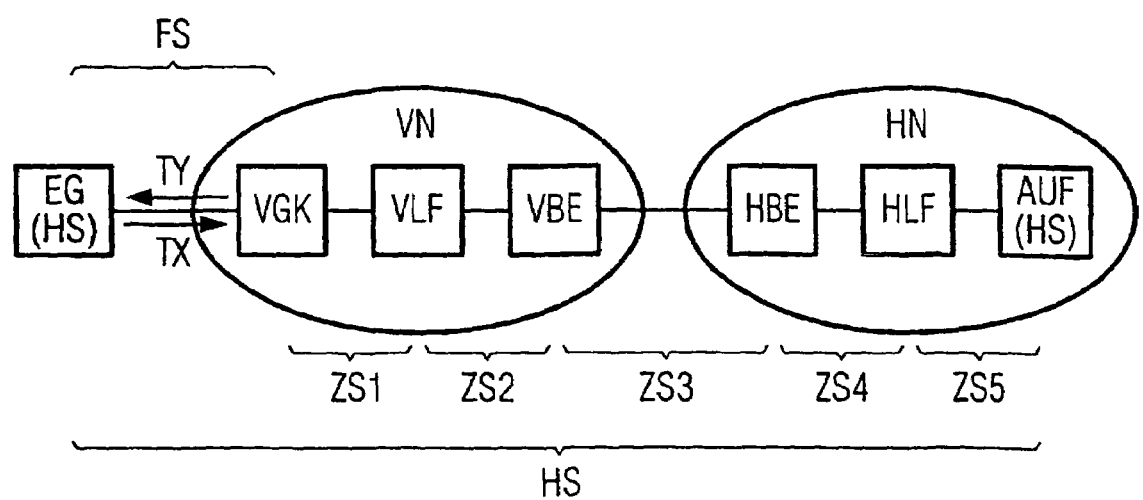
FIG. 1 is a schematic illustration of a communication system comprising a plurality of communication networks.

Referring now to the figures of the drawing in detail and first, particularly, to FIG. 1 thereof, there is shown a schematic of a communication system, which comprises a home location network HN of a mobile user and an external network VN. In the instant case, the mobile user intends to connect to the external network VN via a terminal EG. Such an external network VN is frequently also referred to in the pertinent art as a "visited network." The home location network HN and the external network VN are coupled together—in some instances via one or a plurality of non-illustrated transit networks. The home location network HN and the external network VN are preferably configured as packet-oriented networks for the real-time transmission of communication data, such as voice, video, and/or multimedia data for example. A communication environment is preferably provided according to the ITU-T recommendation H.323 or according to the SIP (Session Initiation Protocol) standard. The terminal EG can be a component of the external network VN used temporarily by the user, e.g. a fixed network telephone or a desktop computer or a terminal coupled temporarily to the external network VN, e.g. a mobile terminal or a portable computer.

In the present exemplary embodiment, the mobile user or the terminal EG used by them is initially only registered in their home location network HN and shares a private home location key HS with the network HN. The home location key HS is stored both in the terminal EG and in an authentication device AUF of the home location network HN. The authentication device AUF, which is frequently also referred to as the "Authentication Function" (AuF), is used to authenticate and authorize users or terminals in the home location network HN.

The home location key HS is not known to the external network VN and any transit networks. In the present exemplary embodiment the home location key stored in the authentication device AUF and the home location key stored in the terminal EG represent a symmetrical home location key pair. The security relationship set up by way of the common home location key HS between the terminal EG and the authentication device AUF is shown in FIG. 1 by a curly bracket (HS).

The terminal EG is coupled to a so-called gatekeeper VGK (visited gatekeeper) of the external network VN, which functions among other things as a data securing device and a connection controller for the external network VN. The gatekeeper VGK is coupled via a user administration device VLF (visitor location function) of the external network VN, a network interface device VBE (visited border element) of the external network VN, a network interface device HBE (home border element) of the home location network HN and a user administration device HLF (home location function) of the home location network HN to the authentication device AUF.

Between adjacent network devices VGK, VLF, VBE, HBE, HLF, and AUF there are security pair relationships, each of which is secured by a private intermediate key pair ZS1, ZS2, ZS3, ZS4, and ZS5. In the present exemplary embodiment, the gatekeeper VGK and the user administration device VLF have the common intermediate key pair ZS1, the user administration device VLF and the network interface device VBE have the common intermediate key pair ZS2, the network interface device VBE and the network interface device HBE have the common intermediate key pair ZS3, the network interface device HBE and the user administration device HLF have the common intermediate key pair ZS4 and the user administration device HLF and the authentication device AUF have the common intermediate key pair ZS5. The transmission route between the gatekeeper VGK and the authentication device AUF is thereby secured link by link. The security pair relationships are each indicated in FIG. 1 by a curly bracket. It should be noted here that one or a plurality of the specified security relationships between the network devices VGK, VLF, VBE, HBE, HLF, and AUF can also be omitted without further intermediate entities with similar security relationships being arranged between the gatekeeper VGK and the authentication device AUF, without thereby having an adverse effect on the method according to the invention.

According to the invention, in the context of connecting the user or the terminal EG to the external network VN, a private external key pair FS is negotiated dynamically between the terminal EG and the gatekeeper VGK by exchanging public partial keys TX and TY. In the present exemplary embodiment, the Diffie-Hellman key agreement protocol is used, with which both private keys of the negotiated external key pair FS correspond. In other words the same key is produced and stored in the terminal EG and in the gatekeeper VGK. The corresponding external keys of the external key pair FS are then also referred to with the reference character FS. The security relationship set up by means of the common external key pair FS between the terminal EG and the gatekeeper VGK is shown in FIG. 1 by a curly bracket.

The private external key pair FS negotiated between the terminal EG and the gatekeeper VGK can be used as a basis for data traffic between the two negotiating partners EG and VGK but said data traffic can only be considered secure, if the partial keys TX and TY exchanged are also authentic in respect of their sender. According to the invention therefore transmission of an authentication request to the home location network is initiated by the gatekeeper VGK to ensure the authenticity of the senders of the partial keys TX, TY.

Figure 2:
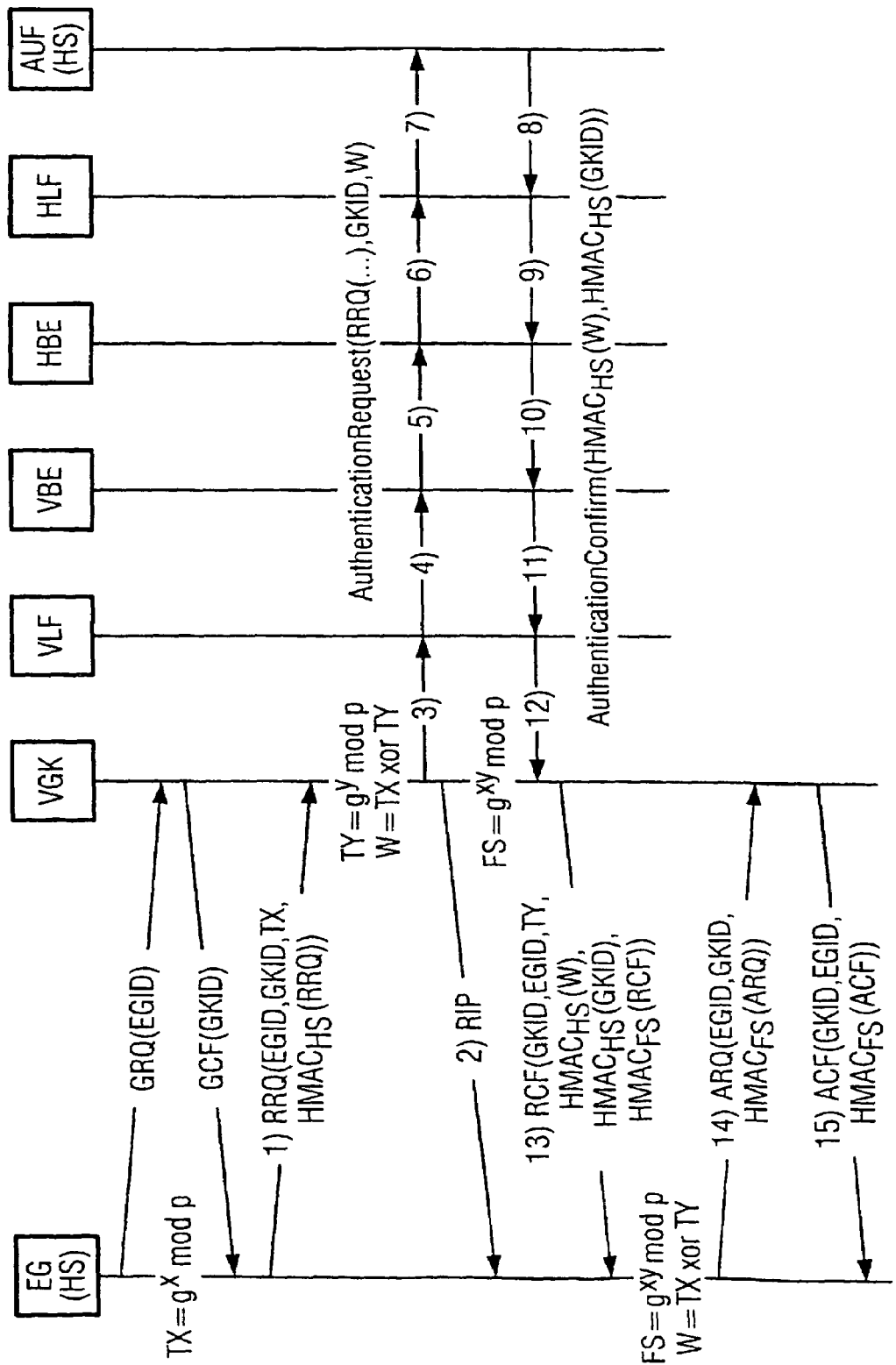

FIG. 2 shows a flow diagram to illustrate the signaling sequence for securing data traffic between the terminal EG and the external network VN.

In the context of connecting the user or the terminal EG used by that user to the external network, a gatekeeper request message GRQ (Gatekeeper Discovery Request according to H.225.0 recommendation) is first transmitted from the terminal EG to the external network VN. The message GRQ contains a code EGID identifying the terminal EG. The message GRQ prompts the gatekeeper VGK to transmit a confirmation message GCF (Gatekeeper Discovery Confirm according to H.225.0 recommendation) for the message GRQ to the terminal EG identified by the code EGID. The confirmation message GCF contains a code GKID identifying the competent gatekeeper VGK.

In the context of the Diffie-Hellman method the partial key TX is then calculated by the terminal EG according to the formula $TX=g^x$ mod p. Here p represents a multiple-digit prime number, g is a basic number smaller than p, and mod represents the mathematical modulo function and x is a private random number less than p-1 produced by the terminal EG.

The subsequent transmission stages are numbered according to their time sequence with the numbers 1 to 15 in FIG. 2.

In the transmission stage 1 a message RRQ for terminal registration (Registration Request according to H.225.0 recommendation) is transmitted from the terminal EG to the gatekeeper VGK. The message RRQ contains the codes EGID and GKID and the calculated partial key TX. A certificate HMACHS(RRQ), produced by the terminal EG for the message RRQ using the home location key HS, is also transmitted with the message RRQ. The general expression $HMAC_K(M)$ is used here and below to designate a certificate produced by means of a private key K for an information item M. Such a certificate can preferably be produced using what is known as a "keyed hashed message authentication code" or a digital signature.

Receipt of the message RRQ prompts the gatekeeper VGK for its part to calculate the partial key TY according to the formula $TY=g^y$ mod p. Here y represents a private random number less than p-1 produced by the gatekeeper VGK. The calculated partial key TY is then linked to the partial key TX received from the terminal EG to form key information W=TX xor TY. "xor" here represents a logical exclusive-or link.

The private external key FS is then calculated by the gatekeeper VGK according to the Diffie-Hellman method from the partial keys TX and TY according to the formula $FS=TX^y$ mod $p=g^{x*y}$ mod p. One particular advantage of the Diffie-Hellman method is that, even if the private random number y or x becomes known, it is practically impossible to derive a private key produced earlier. This characteristic is frequently referred to as 'perfect forward secrecy'. This characteristic enhances the security of the method significantly. A further advantage of the Diffie-Hellman method is that the partners involved in producing the key contribute in a symmetrical manner to the common key.

This prevents the key production from being dominated by one party and in some instances from being weak.

In the transmission stage 2, a processing message RIP (Request in Progress according to H.225 recommendation) is transmitted from the gatekeeper VGK to the terminal EG in response to receipt of the message RRQ. An authentication request message AuthenticationRequest is also created by the gatekeeper VGK, which is transmitted in the transmission stages 3, 4, 5, 6 and 7 via the user administration VLF, the network interface device VBE, the network interface device HBE and the user administration HLF to the authentication device AUF of the home location network HN. The authentication request message AuthenticationRequest contains the message RRQ certified by the terminal EG, the key information W and the code GKID of the gatekeeper VGK. The authentication request message AuthenticationRequest can also contain certificates (not shown) transmitted respectively between adjacent network devices, which were produced by means of the intermediate key pairs ZS1, ZS2, ZS3, ZS4 or ZS5.

After receipt of the authentication request message, the authentication device AUF verifies the message RRQ certified by the terminal by means of the home location key HS, thereby ascertaining the authenticity of the terminal. Also the authentication device AUF uses the home location key HS to produce a certificate $HMAC_{HS}(W)$ for the key information W and a certificate $HMAC_{HS}(GKID)$ for the code GKID respectively. If the terminal EG and the gatekeeper VGK were found to be authentic, the authentication device AUF creates an authentication confirmation message AuthenticationConfirm, which contains the certificates $HMAC_{HS}(W)$ and $HMAC_{HS}(GKID)$.

The thus-created authentication confirmation message AuthenticationConfirm is then transmitted in the transmission stages 8, 9, 10, 11 and 12 via the user administration HLF, the network interface device HBE, the network interface device VBE and the user administration VLF to the gatekeeper VGK. The authentication confirmation message AuthenticationConfirm can contain certificates transmitted respectively between adjacent network devices, which were produced by way of the intermediate key pairs ZS1, ZS2, ZS3, ZS4 or ZS5. If the terminal EG proves not to be authentic, a negative authentication message AuthenticationReject (not illustrated) is transmitted from the authentication device AUF to the gatekeeper VGK instead of the authentication confirmation message AuthenticationConfirm.

The gatekeeper VGK can use the authentication confirmation message AuthenticationConfirm to verify the authenticity and authorization of the terminal EG and the authenticity of the signaling information W and thereby the partial key TX. In the event of positive verification, the external key FS is accepted as secure by the gatekeeper VGK. The gatekeeper VGK is also prompted by receipt of the authentication confirmation message to transmit a confirmation message RCF (Registration Confirm according to H.225.0 recommendation) for the message RRQ to the terminal EG in the transmission stage 13. The confirmation message RCF contains the codes GKID and EGID, the partial key TY and the certificates $HMAC_{HS}(W)$ and $HMAC_{HS}(GKID)$. A certificate HMACFS(RCF) is also transmitted with the confirmation message RCF, as having been produced by the gatekeeper VGK for said confirmation message RCF using the newly produced external key FS.

For its part the terminal EG uses the partial key TY contained in the confirmation message RCF to calculate the private external key FS according to the formula $FS=TY^x \mod p = g^{y*x} \mod p$ and the key information $W=TX \text{ xor } TY$. The terminal EG can now also use the external key FS, the home location key HS and the key information W to verify the received certificates $HMAC_{HS}(W)$, $HMAC_{HS}(GKID)$ and $HMAC_{FS}(RCF)$ and thereby the authenticity of the gatekeeper VGK and the partial key TY. In the event of positive verification, the external key FS is accepted as secure by the terminal EG.

In the transmission stage 14 an access request message ACF (Admission Request according to H.225.0 recommendation) containing the codes EGID and GKID is transmitted from the terminal EG to the gatekeeper VGK. A certificate $HMAC_{FS}(ARQ)$ based on the accepted external key FS is transmitted with the access request message ACF. The access request message ACF is then confirmed in the transmission stage 15 by the gatekeeper VGK by means of the access confirmation message ACF (Admission Confirm according to H.225.0 recommendation), also certified by means of the external key FS, as a result of which the terminal EG is connected securely to the external network VN.

Due to the, in some instances retroactive, verification of the partial keys TX, TY and their senders by the terminal EG and the gatekeeper VGK, the external key FS forms a secure base for protecting the data traffic between the terminal EG and the external network VN. As only the terminal EG and the gatekeeper VGK are involved in the production of the external key FS and the external key FS produced is not transmitted, the method according to the present exemplary embodiment ensures a very high level of information security. As the external key FS is also newly produced when the user or terminal EG is connected to the external network VN, the possibility is practically excluded that an external network could be externally masked with an external key produced earlier, thereby obtaining unauthorized access to other external networks. It should also be noted that the key information W does not in any way allow conclusions to be drawn about the private random numbers x and y or the private external key FS.

One variant of an embodiment of the invention is shown in the flow diagram in FIG. 3. The variant of the embodiment differs from the embodiment according to FIG. 2 by the additional transmission of the key information W in the authentication confirmation message AuthenticationConfirm. The gatekeeper VGK can use the key information W transmitted in the authentication confirmation message AuthenticationConfirm to verify the authenticity of the confirmation message, by comparing the key information W contained therein with the key information originally produced in the gatekeeper VGK. This prevents an attack on the network environment, wherein the attacker first intercepts the transmission protocol and then allows authentication of a non-authentic terminal by transmitting the intercepted authentication confirmation message to the gatekeeper.

A significant advantage of the method according to the invention is that the authentication request can be implemented very effectively and very quickly. The authentication request can generally be bundled in very few—in the present exemplary embodiment only two—transmission processes between the external network VN and the home location network HN. The transmission of the partial keys TX and TY between the terminal EG and gatekeeper VGK can advantageously be synchronized with the transmission processes for the authentication request or integrated therein. An authentication request is preferably only implemented once per connecting process. Any subsequent data traffic between the terminal EG and the external network VN can then be secured by means of the local external key FS, without directing additional time-consuming requests to the home location network HN.

A further advantage of the invention is that no data encryption methods, which might infringe export restrictions, have to be deployed for transmission processes between the external network VN and the home location network HN.

We claim:

1. A method in a mobile network environment for securing data traffic between an external network and a terminal of a mobile user coupled to the external network, wherein the mobile user can be authenticated in a home location network by way of a private home location key pair, the method which comprises:
    a) producing a private external key pair by exchanging partial keys between the terminal and a data securing device of the external network;
    b) transmitting from the data securing device to the home location network an item of key information based on at least one of the partial keys and a message certified by the terminal by way of a first home location key of the private home location key pair;
    c) verifying the certification of the message in the home location network with a second home location key of the private home location key pair, and producing a certificate for the key information;
    d) transmitting the certificate to the data securing device; and
    e) accepting the private external key pair for securing the data traffic subject to verification of the certificate transmitted from the home location network.

2. The method according to claim 1, which comprises transmitting the certificate from the data securing device to the terminal and verifying the certificate with the terminal.

3. The method according to claim 1, which comprises verifying the certificate with the data securing device.

4. The method according to claim 1, which comprises, if the step of verifying the certification of the message produces a negative result, transmitting a negative authentication message from the home location network to the data securing device.

5. The method according to claim 1, which comprises producing the private external key pair with a Diffie-Hellman method.

6. The method according to claim 1, which comprises transmitting the message and the key information to the home location network in the context of an authentication request.

7. The method according to claim 1, which comprises transmitting the key information to the home location network within the message.

8. The method according to claim 1, which comprises producing a common certificate for the message and the key information and transmitting the common certificate to the data securing device.

9. The method according to claim 1, which comprises transmitting a code identifying at least one of the terminal and the data securing device to the home location network for certification.

10. The method according to claim 9, which comprises producing a common certificate for the code and for at least one of the message and the key information and transmitting the common certificate to the data securing device.

11. The method according to claim 1, which comprises producing the key information by arithmetically and/or logically linking a plurality of partial keys.

12. The method according to claim 1, which comprises producing the key information by arithmetically and/or logically linking at least one partial key and security information produced by the terminal.

13. The method according to claim 1, which comprises effecting the exchange of partial keys between the terminal and the data securing device in the context of data transmissions between the terminal and the data securing device as required for an exchange of data with the home location network.

14. The method according to claim 1, which comprises exchanging data between the data securing device and the home location network with signaling messages according to ITU-T recommendation H.235.

15. The method according to claim 1, which comprises transmitting at least one part of the key information transmitted by the data securing device to the home location network from the home location network to the data securing device and accepting the private external key pair for securing the data traffic subject to verification of the transmitted part of the key information.

16. The method according to claim 15, which comprises verifying the transmitted part of the key information in the data securing device.

17. The method according to claim 15, which comprises transmitting all of the key information transmitted by the data securing device to the home location network from the home location network to the data securing device, and verifying all of the key information.

18. The method according to claim 15, which comprises, for the purpose of verifying the part of the key information transmitted from the home location network, determining whether or not the part of the key information transmitted from the home location network is part of the key information transmitted by the data securing device to the home location network.

* * * * *